United States Patent [19]
Carper et al.

[11] Patent Number: 5,947,548
[45] Date of Patent: Sep. 7, 1999

[54] AERODYNAMIC DRAG REDUCING GEOMETRY FOR LAND-BASED VEHICLES

[76] Inventors: Herbert J. Carper, 5709 77th St., Lubbock, Tex. 79424; Randal Scott Funderburk, 34750 Lakeshore Blvd. #103C, Cleveland, Ohio 44095

[21] Appl. No.: 08/681,863

[22] Filed: Jul. 29, 1996

[51] Int. Cl.⁶ .................................................. B62D 35/00
[52] U.S. Cl. ..................................... 296/180.1; 296/180.4
[58] Field of Search ........................... 296/180.1, 180.2, 296/180.3, 180.4, 180.5

[56] References Cited

U.S. PATENT DOCUMENTS 5,058,945  10/1991  Elliott, Sr. et al. .............. 296/180.4 X

*Primary Examiner*—Andrew C. Pike

[57] ABSTRACT

An optimized aerodynamic drag reducing geometry for land-based vehicles incorporates a system of connected surfaces that utilizes square to round surface transitional design concepts to manage the flow stream around the rear or aft section of a land-based vehicle such as a semi-tractor trailer. The drag reduction is maximized primarily by reducing the total pressure drag on the vehicle.

2 Claims, 6 Drawing Sheets

AERODYNAMIC DRAG REDUCING GEOMETRY FOR LAND-BASED VEHICLES

BACKGROUND OF THE INVENTION

1. Field of the Invention

This invention relates to the design of an aerodynamic drag reduction geometry for maximizing the drag reducing capability of geometric shapes mounted or configured on the aft section of land-based vehicles.

2. Discussion of the Prior Art

It is well known that attempts to streamline the aft or rear section of land-based vehicles have the potential to reduce aerodynamic drag and improve fuel efficiency. Various concepts have been proposed and disclosed in the public domain literature including patents and aerodynamic texts. However, none of these designs describes an optimized shape for reducing aerodynamic drag. This is due to the attempts by authors to apply classical aircraft-based aerodynamic theory and intuition to land-based vehicle applications. Aircraft present an ideal model to apply aft section aerodynamic geometry due to their predictable forebody streamlining, their zero degree yaw flow stream condition during flight, and their generally cylindrically shaped fuselages. In addition, aircraft aerodynamic drag reduction systems are generally intended to function as the aircraft flies in three-dimensional space free of the ground.

To predict fluid flow around a body such as an airfoil, classical aerodynamic theory assumes that the airfoil is remote from any stationary surface. Land-based vehicles such as autos and trucks are an exception to classical theory because of the proximity of the vehicle to the ground. The problem is complicated by the generation of turbulence by the wheels, axles, and other structure under the vehicles. Because predictable flow dynamics of a vehicle proximal to the ground are not predicted accurately by theory, optimizing land-based vehicle aft section geometry requires empirical analysis and testing.

Land-based vehicles are often subjected to yaw flow-stream conditions due to crosswinds. Classical aerodynamic theory and intuition once again do not accurately predict yaw-induced turbulent flow and related drag. Combining the effects of the proximity of the vehicle to the ground with yaw flow conditions results in a complex nonpredictable turbulent flow condition that can only be described as chaotic. This nonpredictability of flow dynamics is characteristic of land-based vehicular aerodynamics and requires sophisticated empirical testing in wind tunnels or drag tanks to begin to understand and design an optimized aft section aerodynamic geometry.

In the case of a vehicle such as a semi-tractor trailer, the typical rear or aft geometry is a sharp-edged rectangular box. The forebody, including the tractor and trailer front section and sides, is usually partially 'rounded' followed with a rectangular box-like geometry. Such geometry is noncharacteristic of basic aircraft design principles and thus presents a problem for classical theory. Such geometry requires empirical testing and analysis to begin to optimize aft section geometry to reduce drag. In the patent literature, many authors propose aft section geometries that are typical of classical approaches. Many proposed geometric shapes follow the classic approach of a conical or ogive shape that tapers to an apex, but in order to achieve maximum drag reduction these devices are usually too long to be practical. Other authors offer designs that do not specify the dimensions of the aft section aerodynamic geometry, thus failing to teach and omitting the most important criteria for a functional drag reducing device. Kerian, U.S. Pat. No. 4,601,508; Elliot, Sr. U.S. Pat. No. 4,702,509; Sutphen, U.S. Pat. No. 4,741,569; Andrus, U.S. Pat. No. 5,236,347; and Flemming, U.S. Pat. No. 5,240,306 describe aerodynamic drag reducers for land-based vehicles that are neither optimized nor found to be practical.

DETAILED DESCRIPTION OF THE INVENTION

We investigated the effect of various shapes in the laboratory using wind tunnel techniques and water drag tank methods. Our investigations found that the optimum geometric shape for a semi-tractor trailer aft section was a novel symmetrical shape that can be best described as a radial surface oriented transition between a square and circle centrically defined on two parallel planes. Optimization to maximize drag reduction includes specific comparative studies. Various geometries and data are presented as Example 1 and Table 1.

Figure 1:
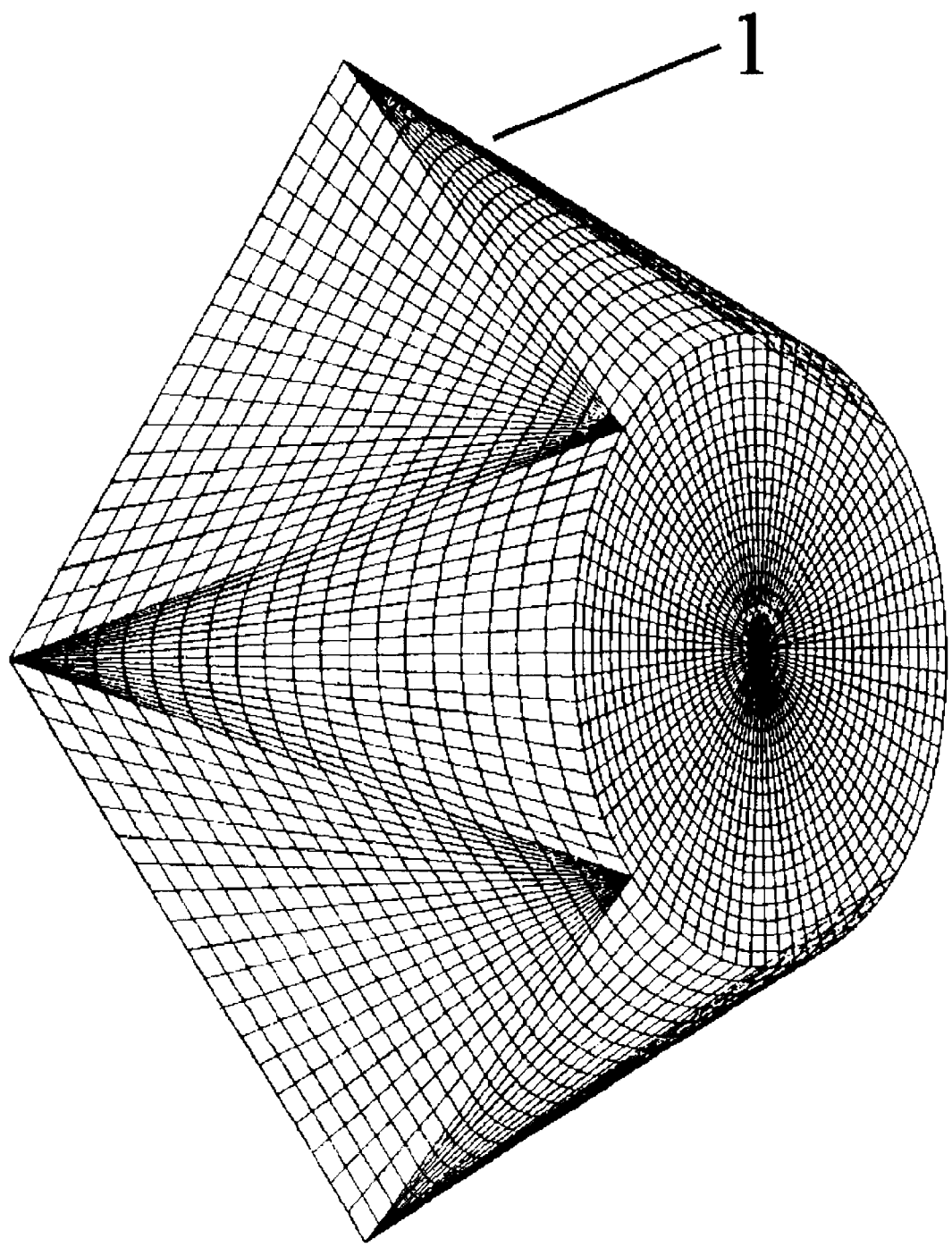
FIG. 1 is an oblique pictorial three-dimensional view of the preferred invention showing the radial corner surfaces, the triangular connecting surfaces, and the rearmost circular surface.
Figure 6:
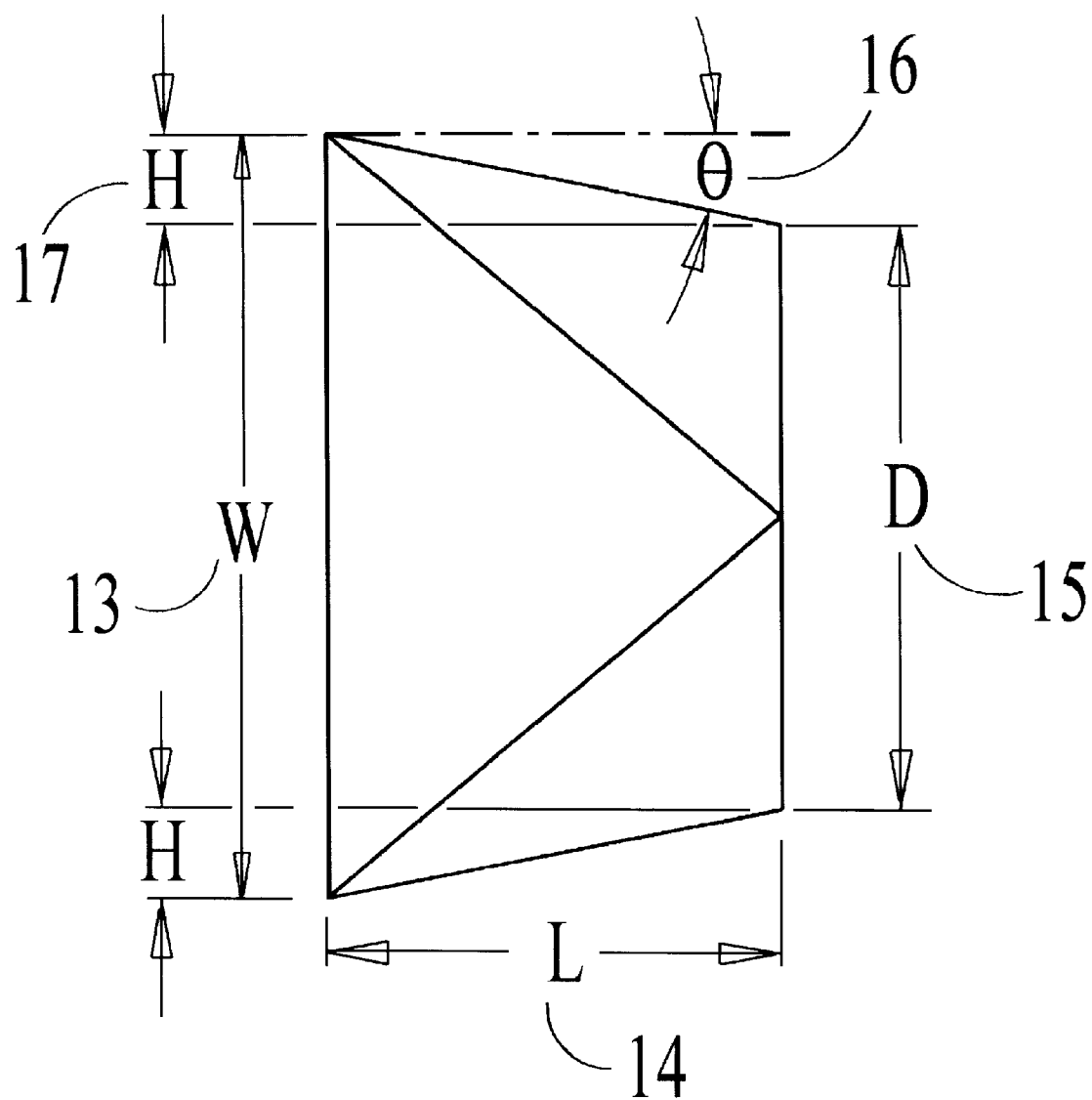
FIG. 6 is a side view of the preferred invention showing the important dimensions and angle.

The optimized geometry found via our studies and disclosed herein as the invention is a semi-symmetrical surface connecting a square and circle defined on two parallel planes wherein the connecting surface is a combination of flat, triangular surface members connected to conical segments as shown in FIG. 1. FIG. 6 defines an angle θ which is measured from extensions of the sides or top of the trailer to the flat, triangular surfaces of the geometric shape. This angle θ is described as being between 8.5 and 14 degrees. As an example, a square equal to the standard semi-tractor trailer width (W) of 102 inches, a length, "L" (FIG. 6), of 60 inches (present limitation by the U.S. Department of Transportation), and an angle θ of 14 degrees, the circular diameter (D) is equal to 72 inches. The radial defined conical segments have a minor radius of approximately zero, and the major radius is always equal to the radius of the rearmost circular surface of the invention. The flat triangular segments connecting the conical and circular surfaces are defined for the invention as side dimension equal to the side dimension of the conical segments and a base dimension equal to 102 inches for standard semi-tractor trailers that are 102 inches in width. The functionality of the present invention that leads to its novelty relates to three specific design criterion:

a. the aerodynamic transition and blend of the forward-most corners of the base of the invention to the circular rearmost surface;

b. the flat, triangular connection surfaces set at an angle from 8.5 to 14 degrees declination from the sides or top of the vehicle;

c. the rearmost circular surface that presents a flat plane normal to the direction of travel.

The transition from a rectangular-shaped vehicle body, such as a semi-trailer, to a round aerodynamic shape requires specific design of radial corners as shown in the figures. Yaw condition flow, such as when the vehicle is traveling in a crosswind, may enhance this requirement such that aerodynamic flow conditions do not become turbulent and drag is increased. The flat, triangular connecting surfaces provide for nonseparated flow of air passing from the flat sides and top of the vehicle and towards the circular rearmost surface. Both the radial corners and flat triangular surfaces function together to direct flow inward in a manner to reduce vortex generation and subsequent drag increases. The rearmost circular surface responds to reverse flow and provides pressure recovery.

EXAMPLE 1

Four shapes designed according to the parameters disclosed by the present invention were studied in a water drag tank. Drag instrumentation was calibrated according to standard practice. Flow speeds were selected to provide a constant Reynolds number in accordance with SAE guidelines to obtain a close approximation to conditions encountered by a full-size truck traveling at highway speeds. Various yaw conditions were studied to simulate crosswind conditions encountered on the roadways by land-based vehicles. The results are shown in Table 1. The investigation showed that for a fixed length 'L', as θ decreased from 24.2 to 8.5 degrees, the drag reduction improved significantly over baseline (a trailer without drag reducing rear geometry). In crosswind conditions, it was found that when θ is equal to 14 degrees, there is a significant drag reduction over the other geometries and baseline.

TABLE 1

| θ | Condition | 0° yaw | 5° yaw | 10° yaw | 15° yaw |
|---|---|---|---|---|---|
| n/a | baseline | 0.467 | 0.551 | 0.724 | 1.035 |
| 24.2° | D/L = 0.8 | 0.461 (−1.27%) | 0.530 (−3.83%) | 0.747 (+3.14%) | 1.015 (−1.94%) |
| 19.3° | D/L = 1.0 | 0.463 (−0.95%) | 0.556 (+0.88%) | 0.683 (−5.63%) | 0.945 (−8.63%) |
| 14.0° | D/L = 1.2 | 0.448 (−4.01%) | 0.530 (−3.85%) | 0.675 (−6.77%) | 0.951 (−8.12%) |
| 8.5° | D/L = 1.4 | 0.427 (−8.61%) | 0.508 (−7.71%) | 0.676 (−6.63%) | 0.995 (−3.84%) |

The data shown in Table 1 represent the drag coefficient and the percent difference in drag coefficient as compared to the baseline (no boattail) configuration. The deviation data are represented as either increase drag (+) over baseline or decrease drag (−) under baseline. As the data show, consistent significant drag reduction occurs at geometries of θ=8.5 and 14 degrees for all yaw conditions. Less significant or inconsistent drag reduction including cases of increased drag is evident for larger angles.

In FIG. 1, the overall geometry of the preferred invention 1 can be viewed as it would appear mounted or configured on the aft section of a land-based vehicle.

Figure 2:
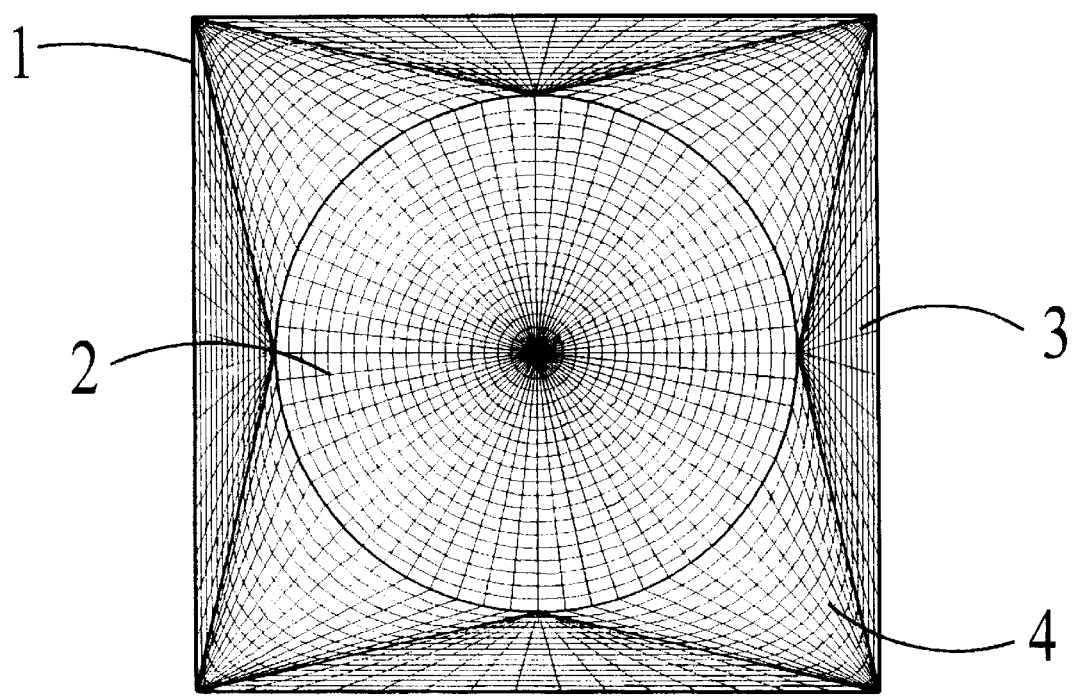
FIG. 2 is a three-dimensional rear view of the preferred invention showing the radial corner surfaces, the triangular connecting surfaces, and the rearmost circular surface.

FIG. 2 shows the three-dimensional view of the preferred invention 1. The rearmost circular surface is shown as 2. The corner surfaces 4 are shown connected to the triangular surfaces 3 and the rearmost surface.

Figure 3:
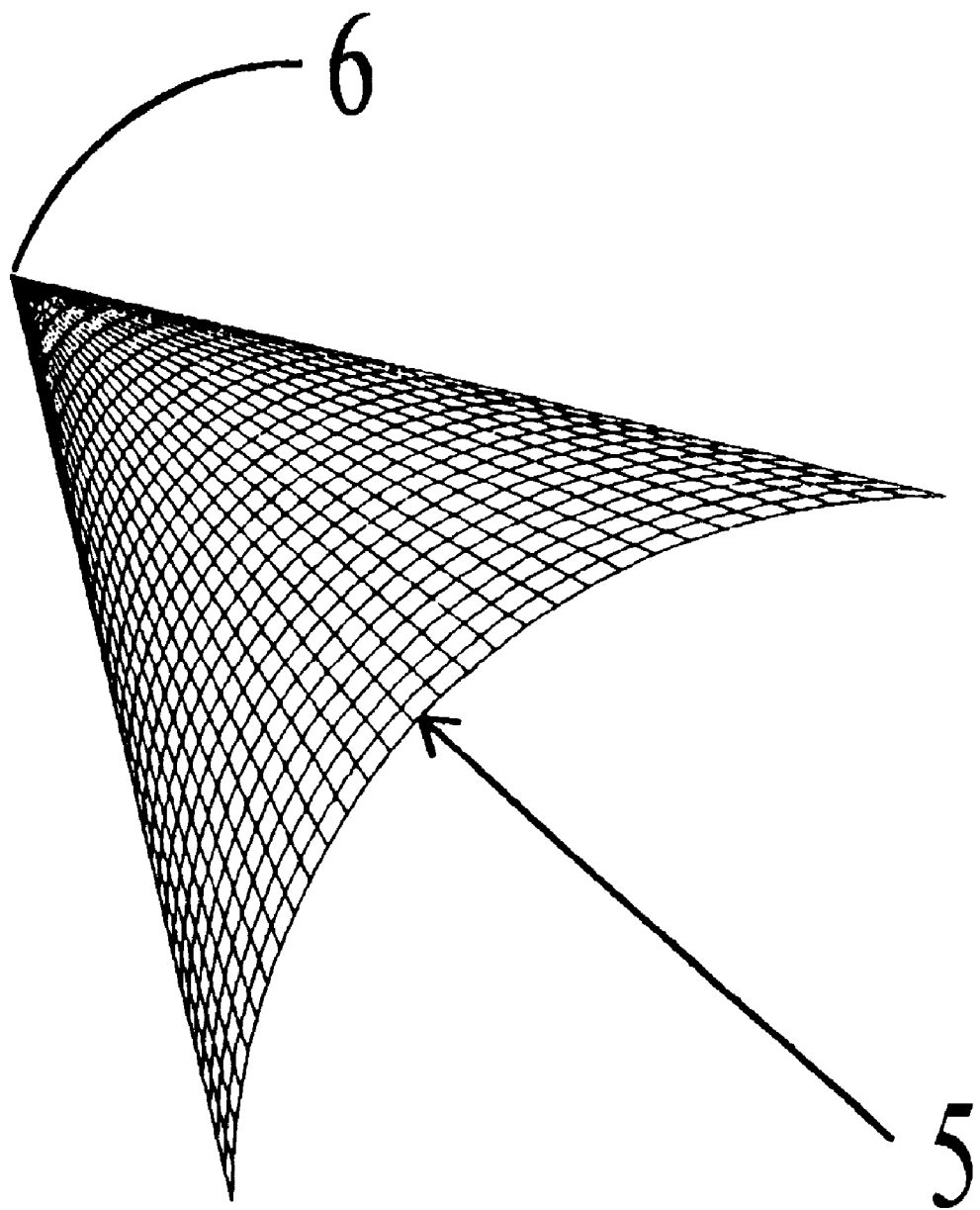
FIG. 3 is a three-dimensional wire-frame view of the radial corner surface showing the detail of the radial geometry.

FIG. 3 shows the radial corner surface with a maximum radius 5 equal to the radius of the rearmost circular surface. The minimum radius 6 of the radial corner surface is shown at the apex. The apex minimum radius begins the surface transition between the corner of the square base and the rearmost circular surface.

Figure 4:
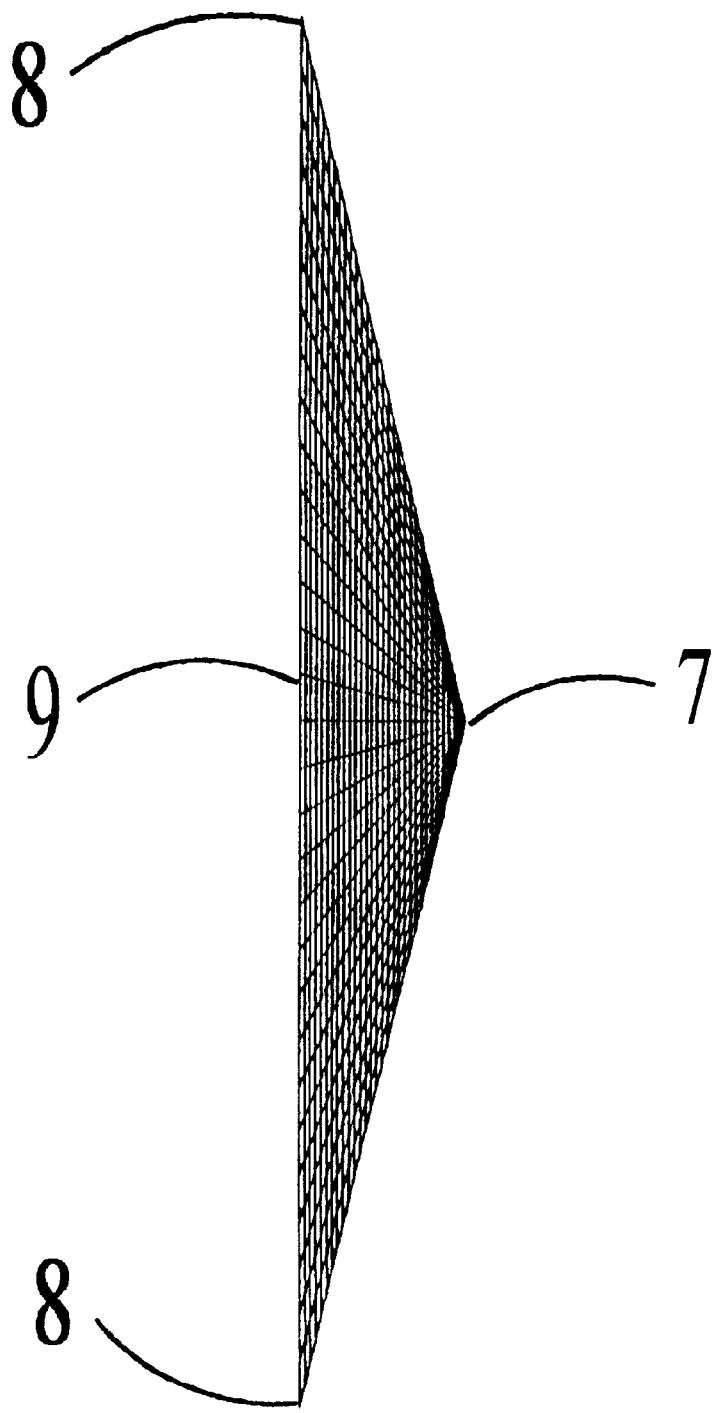
FIG. 4 is a three-dimensional wire-frame view of the triangular surface showing the detail of the flat triangular geometry.

FIG. 4 shows the flat triangular surface with an apex 7 designed to intersect with the rearmost circular surface. The base corners 8 are shown at the extremes of the baseline 9 of the flat triangular surface.

Figure 5:
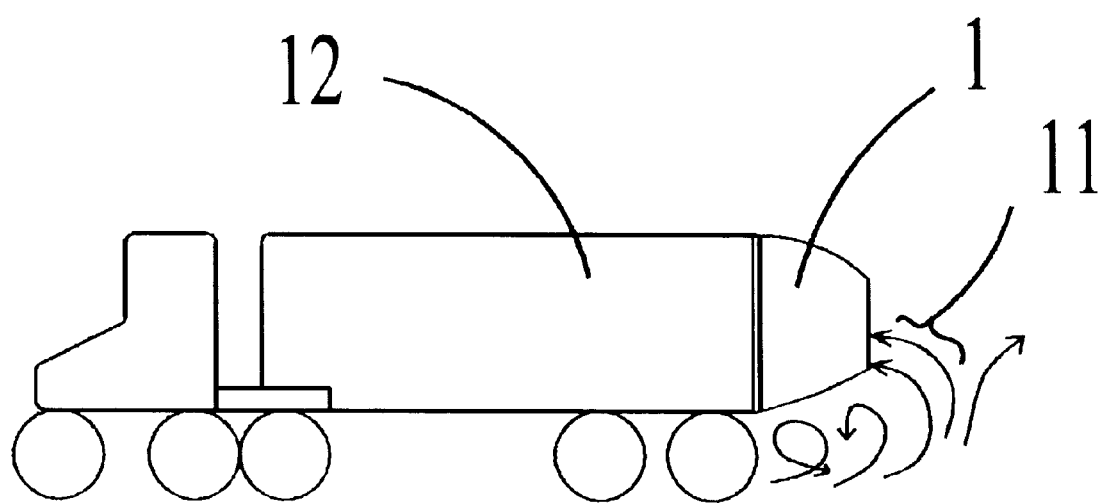
FIG. 5 is a side view of the preferred invention mounted on a semi-tractor trailer showing the trubulence on the rearmost circular surface.

FIG. 5 shows the preferred invention 1 mounted or configured on the rear of a semi-tractor trailer 12 and turbulence is shown as 11.

FIG. 6 shows a side view of the invention depicting a base surface height (W) as 13. The overall length of the invention (L) is shown as 14. The rearmost surface diameter (D) is shown as 15. The angle θ is shown as 16. The measured distance between the base surface height (W) and the rearmost surface diameter (D) is depicted as (H) and shown as 17. As described in the example, the invention discloses a preferred angle from 8.5 to 14 degrees. The mathematical relationships to determine the overall dimensions of the invention from the preferred angle θ is as follows:

$$W = D + 2H$$

$$H = L \tan \theta$$

What we claim is:

1. An aerodynamic drag reduction geometry for land-based vehicles comprising a square-shaped base surface, a rearmost circular surface that has a radius and is oriented along a parallel plane to that of said base surface and oriented centrically to said base surface, four radial corner surfaces with a major radius equal to the radius of said rearmost circular surface and connected to said circular surface and said base surface, and four flat triangular surfaces connected to said circular surface with an angle (θ) defined between the said circular surface and said flat triangular surfaces, said base surface, and said radial corner surfaces.

2. An aerodynamic drag reduction geometry for land-based vehicles as in claim 1 wherein the angle (θ) is between 8.5 and 14 degrees.

* * * * *